United States Patent
Kumar et al.

(10) Patent No.: US 6,912,240 B2
(45) Date of Patent: Jun. 28, 2005

(54) METHOD AND APPARATUS FOR GENERATING A LARGE NUMBER OF CODES HAVING DESIRABLE CORRELATION PROPERTIES

(75) Inventors: P. Vijay Kumar, Rancho Palos Verdes, CA (US); Marcus H. Pendergrass, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 745 days.

(21) Appl. No.: 09/991,607

(22) Filed: Nov. 26, 2001

(65) Prior Publication Data

US 2003/0099280 A1 May 29, 2003

(51) Int. Cl.[7] .................................................. H04B 1/69
(52) U.S. Cl. ........................................ 375/130; 375/150
(58) Field of Search ................................. 375/130, 150, 375/147, 316, 343, 132; 370/342, 335, 320, 441, 321, 347

(56) References Cited

U.S. PATENT DOCUMENTS

| | | | | |
|---|---|---|---|---|
| 5,353,352 A | * | 10/1994 | Dent et al. | 380/37 |
| 6,005,894 A | * | 12/1999 | Kumar | 375/270 |
| 6,320,897 B1 | * | 11/2001 | Fattouche et al. | 375/130 |

OTHER PUBLICATIONS

"The Theory of Error–Correcting Codes" MacWilliams et al., North–Halland Mathematical Library, vol. 16, Bell Laboratories.

"New Constructions of Optimal Cyclically Permutable Constant Weight Codes" Moreno et al., IEEE Transactions of Information Theory, vol. 41, No. 2, Mar. 1995.

* cited by examiner

*Primary Examiner*—Khai Tran
(74) *Attorney, Agent, or Firm*—Venable LLP; Robert Babayi

(57) ABSTRACT

The present invention relates to a method for generating and apparatus for employing code families having desirable correlation properties. Regardless of code length, maximum autocorrelation of the codes is 4 for any nonzero offset and maximum cross-correlation of any two codes from a code family is 4 for any offset. The codes can be used in impulse radio systems and non-impulse radio systems including CDMA, TDMA, FDMA, OFDM and various other frequency hopping and direct sequence systems. The codes can be used to specify various impulse radio and non-impulse radio signal characteristics including pulse position in time, amplitude, width, type, phase, phase difference, frequency, spreading code, etc. The codes have the unique property that they can specify as many as two components in which a signal is not present. A method of code compression is provided.

20 Claims, 13 Drawing Sheets

Corresponding to each Δt $f^{(0)}(x) = x^2 + x$ $\Downarrow$ $\beta^i$ \ $\alpha^j$

|  | 1 | 2 | 4 | 3 |
|---|---|---|---|---|
| 1 | 0 | 1 | 0 | 0 |
| 3 | 0 | 0 | 0 | 0 |
| 4 | 0 | 0 | 0 | 0 |
| 2 | 1 | 0 | 0 | 1 |

$f^{(1)}(x) = x^2 + x + 1$ $\Downarrow$ $\beta^i$ \ $\alpha^j$

|  | 1 | 2 | 4 | 3 |
|---|---|---|---|---|
| 1 | 0 | 0 | 1 | 0 |
| 3 | 1 | 0 | 0 | 1 |
| 4 | 0 | 0 | 0 | 0 |
| 2 | 0 | 1 | 0 | 0 |

$f^{(2)}(x) = x^2 + x + 2$ $\Downarrow$ $\beta^i$ \ $\alpha^j$

|  | 1 | 2 | 4 | 3 |
|---|---|---|---|---|
| 1 | 0 | 0 | 0 | 0 |
| 3 | 0 | 1 | 0 | 0 |
| 4 | 1 | 0 | 0 | 1 |
| 2 | 0 | 0 | 1 | 0 |

$f^{(3)}(x) = x^2 + x + 3$ $\Downarrow$ $\beta^i$ \ $\alpha^j$

|  | 1 | 2 | 4 | 3 |
|---|---|---|---|---|
| 1 | 0 | 0 | 0 | 0 |
| 3 | 0 | 0 | 1 | 0 |
| 4 | 0 | 1 | 0 | 0 |
| 2 | 0 | 0 | 0 | 0 |

$f^{(4)}(x) = x^2 + x + 4$ $\Downarrow$ $\beta^i$ \ $\alpha^j$

|  | 1 | 2 | 4 | 3 |
|---|---|---|---|---|
| 1 | 1 | 0 | 0 | 1 |
| 3 | 0 | 0 | 0 | 0 |
| 4 | 0 | 0 | 1 | 0 |
| 2 | 0 | 0 | 0 | 0 |

$f^{(5)}(x) = x + 1$ $\Downarrow$ $\beta^i$ \ $\alpha^j$

|  | 1 | 2 | 4 | 3 |
|---|---|---|---|---|
| 1 | 0 | 0 | 0 | 0 |
| 3 | 0 | 1 | 0 | 0 |
| 4 | 0 | 0 | 0 | 1 |
| 2 | 1 | 0 | 0 | 0 |

FIG. 12

| 10 | 34 | 53 | 73 | 100 | 123 | 134 | 169 | 197 | 214 | 229 | 267 | 301 | 311 | 332 | 368 | 384 | 410 | 432 | 461 | 469 | |
|---|---|---|---|---|---|---|---|---|---|---|---|---|---|---|---|---|---|---|---|---|---|
| 14 | 26 | 47 | 74 | 92 | 126 | 139 | 155 | 187 | 207 | 223 | 242 | 285 | 287 | 329 | 337 | 361 | 388 | 416 | 438 | 451 | 470 |
| 20 | 39 | 65 | 72 | 105 | 119 | 140 | 166 | 201 | 241 | 252 | 275 | 298 | 319 | 338 | 355 | 394 | 401 | 423 | 468 | | |
| 5 | 41 | 55 | 81 | 107 | 113 | 138 | 158 | 176 | 219 | 231 | 256 | 290 | 336 | 373 | 379 | 398 | 420 | 440 | 477 | | |
| 2 | 40 | 67 | 106 | 131 | 147 | 171 | 186 | 209 | 262 | 264 | 303 | 308 | 345 | 363 | 376 | 403 | 425 | 450 | 463 | | |
| 7 | 35 | 44 | 78 | 101 | 121 | 133 | 173 | 190 | 220 | 247 | 274 | 305 | 318 | 331 | 381 | 404 | 426 | 454 | 474 | | |
| 8 | 38 | 54 | 70 | 104 | 144 | 172 | 196 | 198 | 230 | 244 | 278 | 304 | 322 | 342 | 352 | 382 | 402 | 424 | 460 | 466 | |
| 6 | 31 | 58 | 83 | 97 | 110 | 136 | 167 | 181 | 208 | 234 | 249 | 284 | 299 | 328 | 334 | 362 | 380 | 411 | 433 | 445 | 479 |
| 15 | 25 | 64 | 85 | 91 | 120 | 149 | 170 | 178 | 212 | 240 | 250 | 269 | 302 | 313 | 347 | 366 | 389 | 397 | 419 | 442 | 481 |
| 1 | 43 | 49 | 84 | 109 | 124 | 151 | 163 | 183 | 218 | 225 | 248 | 266 | 295 | 310 | 349 | 372 | 375 | 408 | 430 | 447 | 480 |
| 12 | 33 | 46 | 79 | 99 | 130 | 150 | 157 | 184 | 203 | 222 | 257 | 271 | 289 | 315 | 348 | 357 | 386 | 400 | 422 | 448 | 475 |
| 4 | 51 | 82 | 115 | 145 | 175 | 182 | 200 | 227 | 243 | 272 | 307 | 316 | 343 | 354 | 378 | 413 | 435 | 446 | 478 | | |
| 17 | 22 | 52 | 75 | 88 | 112 | 148 | 165 | 191 | 205 | 228 | 254 | 270 | 297 | 314 | 346 | 359 | 391 | 415 | 437 | 455 | 471 |
| 19 | 32 | 50 | 69 | 98 | 117 | 141 | 177 | 206 | 226 | 246 | 279 | 323 | 339 | 360 | 393 | 414 | 436 | 441 | 465 | | |
| 18 | 36 | 59 | 87 | 102 | 118 | 135 | 154 | 188 | 204 | 235 | 259 | 265 | 286 | 309 | 333 | 358 | 392 | 409 | 431 | 452 | 483 |
| 13 | 42 | 45 | 77 | 108 | 116 | 153 | 164 | 180 | 213 | 221 | 261 | 276 | 296 | 320 | 351 | 367 | 387 | 412 | 434 | 444 | 473 |
| 16 | 27 | 56 | 93 | 125 | 143 | 168 | 193 | 199 | 232 | 260 | 268 | 300 | 312 | 341 | 353 | 390 | 405 | 427 | 457 | | |
| 9 | 24 | 48 | 66 | 90 | 111 | 174 | 195 | 210 | 224 | 255 | 281 | 306 | 325 | 364 | 383 | 399 | 421 | 459 | 462 | | |
| 3 | 29 | 61 | 76 | 95 | 122 | 132 | 159 | 194 | 202 | 237 | 258 | 283 | 291 | 327 | 330 | 356 | 377 | 417 | 439 | 458 | 472 |
| 21 | 30 | 63 | 80 | 96 | 114 | 142 | 156 | 189 | 215 | 239 | 251 | 282 | 288 | 326 | 340 | 369 | 395 | 407 | 429 | 453 | 476 |
| 11 | 28 | 62 | 86 | 94 | 127 | 146 | 161 | 192 | 217 | 238 | 245 | 277 | 293 | 321 | 344 | 371 | 385 | 456 | 482 | | |
| 37 | 57 | 71 | 103 | 129 | 152 | 162 | 185 | 216 | 233 | 263 | 280 | 294 | 324 | 350 | 370 | 396 | 418 | 449 | 467 | | |
| 0 | 23 | 60 | 68 | 89 | 128 | 137 | 160 | 179 | 211 | 236 | 253 | 273 | 292 | 317 | 335 | 365 | 374 | 406 | 428 | 443 | 464 |
| 10 | 25 | 57 | 68 | 108 | 122 | 146 | 172 | 191 | 199 | 227 | 269 | 294 | 317 | 351 | 356 | 385 | 402 | 437 | 457 | 478 | |

Figure 15

METHOD AND APPARATUS FOR GENERATING A LARGE NUMBER OF CODES HAVING DESIRABLE CORRELATION PROPERTIES

CROSS-REFERENCE TO OTHER APPLICATIONS

The following applications of common assignee may contain common disclosure with the present application:

U.S. patent application Ser. No. 09/638,192 entitled "A METHOD FOR SPECIFYING NON-TEMPORAL PULSE CHARACTERISTICS", filed on Aug. 15, 2000.

U.S. patent application Ser. No. 09/638,046 entitled "A METHOD AND APPARATUS FOR APPLYING CODES HAVING PREDEFINED PROPERTIES", filed on Aug. 15, 2000.

U.S. patent application Ser. No. 09/637,878 entitled "A METHOD AND APPARATUS FOR POSITIONING PULSES USING A LAYOUT HAVING NON-ALLOWABLE REGIONS", filed on Aug. 15, 2000.

U.S. patent application Ser. No. 09/638,150 entitled "A METHOD AND APPARATUS FOR POSITIONING PULSES IN TIME", filed on Aug. 15, 2000.

U.S. patent application Ser. No. 09/638,151 entitled "A METHOD AND APPARATUS FOR MAPPING PULSES TO A NON-FIXED LAYOUT", filed on Aug. 15, 2000.

U.S. patent application Ser. No. 09/638,152 entitled "A METHOD AND APPARATUS FOR SPECIFYING PULSE CHARACTERISTICS USING CODE THAT SATISFIES PREDEFINED CRITERIA", filed on Aug. 15, 2000.

U.S. patent application Ser. No. 09/638,153 entitled "A METHOD FOR SPECIFYING PULSE CHARACTERISTICS USING CODES", filed on Aug. 15, 2000.

U.S. patent application Ser. No. 09/638,154 entitled "A METHOD FOR SPECIFYING NON-ALLOWABLE PULSE CHARACTERISTICS", filed on Aug. 15, 2000.

U.S. patent application Ser. No. 09/708,025 entitled "A METHOD AND APPARATUS FOR GENERATING A PULSE TRAIN WITH SPECIFIABLE SPECTRAL RESPONSE CHARACTERISTICS", filed on Nov. 8, 2000.

The above-listed applications are incorporated herein by reference in their entireties.

TECHNICAL FIELD

The present invention relates to impulse radio systems and, more particularly, to a method and apparatus for generating codes with desired correlation properties.

BACKGROUND OF THE INVENTION

As the communication bandwidth in the crowded frequency spectrum becomes an increasingly scarce and valuable commodity, significant efforts are being applied to devise methods that enable more efficient use of available bandwidth. In addition, significant efforts are being applied to an alternative form of radio technology known as Ultra Wideband (UWB) technology.

UWB technology involves the transmission and reception of very low power, extremely short-duration pulses for use in multiple-access communications, radar, and positioning applications, among other things. As its name implies, UWB signals have an extremely wide frequency bandwidth on the order of one or more gigahertz (GHz). Because UWB communication systems are based on communicating extremely short-duration pulses (e.g., picoseconds in duration), such systems are also known as impulse radio systems. Impulse radio systems are described in a series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Impulse radio systems are radically different from conventional narrowband radio systems including multiple access spread-spectrum (also referred to as wideband) systems such as Code Division Multiple Access (CDMA), Time Division Multiple Access (TDMA), Frequency Division Multiple Access (FDMA), and Orthogonal Frequency Division Multiplexing (OFDM) systems. Unlike such non-impulse radio systems, which use continuous sinusoidal waveforms for transmitting information, an impulse radio transmitter emits a train of short electromagnetic pulses, which are shaped to approach a Gaussian monocycle. The impulse transmitter generates pulses and applies them to a specified transmission medium, via a coupler, such as an antenna, which electromagnetically radiates the pulses for reception by an impulse radio receiver. The transmitter may also modulate the generated pulses to convey information.

The impulse radio receiver is a single-stage direct conversion receiver with a correlator front end that coherently converts the received pulses into a baseband signal based on a priori knowledge of the relative timing of the pulses. The impulse radio receiver depends, in part, on processing gain to achieve rejection of unwanted signals. The correlator detects and integrates the desired received pulses coherently, while undesired noise signals are integrated non-coherently. In this manner, the impulse radio receiver effectively extracts the low power pulse train signal from the noise. Additionally, an impulse radio transmitter may modulate multiple pulses to represent a single data bit, thus enabling an impulse radio receiver to integrate the multiple pulses to achieve a signal-to-noise ratio sufficient to recover the data bit over longer distances or in the presence of interference. Because of these high processing gains, impulse radio systems are relatively immune to unwanted signals and interference that limit the performance of conventional (non-impulse) radio systems. Furthermore, these high processing gains allow for much higher dynamic ranges than those commonly achieved by conventional spread-spectrum systems.

Impulse radio systems typically transmit and receive pulses in accordance with a time-hopping code that specifies the relative time positions of the pulses. As such, the time-hopping code defines a communication channel that can be considered as a unidirectional data path for communicating information at high speed. The time-hopping code, which may be locally generated in real-time or stored in a memory storage device, may be applied in accordance with a periodic timing signal that corresponds to the data-rate of the multi-state information signal. The data rate of the impulse radio transmission may, for example, be a fraction of a periodic timing signal that is used as a time base or time reference. In this manner, the time-hopping code determines the nominal positions of the pulses.

In order to communicate information over such channels, impulse radio transmitters may use one or more forms of modulation such as pulse position modulation, flip modulation, or vector modulation. Pulse position modulation is a form of time modulation where pulse positions are varied from nominal positions based on instantaneous samples of a modulating information signal. The modulating information signal may, for example, be a multi-state information signal, such as a binary signal. Under this arrangement, each pulse is time modulated by adjusting its position to one of two or more possible times. For example, in order to send a "0" binary bit, the pulse may be offset from a nominal position by about −50 picoseconds. For a "1" binary bit, the pulse may be offset from the nominal position by about +50 picoseconds. One-of-many Position Modulation (OMPM) is described in co-owned, co-pending patent application titled "Apparatus, System and Method for One-of-Many Position Modulation in an Impulse Communications System," application Ser. No. 09/875,290, filed Jun. 7, 2001, assigned to the assignee of the present invention and incorporated herein by reference.

Flip modulation is a form of modulation where pulses may be inverted, or flipped, depending on the modulating information signal. For example, in order to send a "0" binary bit, a non-inverted pulse may be transmitted at its nominal position. For a "1" binary bit, an inverted pulse may be transmitted. Pulse position and flip modulation can also be combined. Flip modulation is further described in co-owned, co-pending patent application titled "Apparatus, System and Method for FLIP Modulation in an Impulse Radio Communications System," application Ser. No. 09/537,692, filed Mar. 29, 2000, assigned to the assignee of the present invention and incorporated herein by reference.

Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Coding techniques have been used in conventional spread-spectrum code division multiple access (SS-CDMA) systems to accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled "Spread-Spectrum Multiple Access Communication System Using Satellite or Terrestrial Repeaters" by Gilhousen et al.

Dent et al. in U.S. Pat. No. 5,353,352 disclose a multiple access coding technique for radio communications, such as cellular systems, in which individual information signals are encoded with a common block error-correction code. The information signals are assigned a unique scrambling mask, or signature sequence, taken from a set of scrambling masks having selected correlation properties. The set of scrambling masks is selected such that the correlation between the modulo-2 sum of two masks with any codeword in the block code is a constant magnitude, independent of the mask set and the individual masks being compared. In one embodiment, when any two masks are summed using modulo-2 arithmetic, the Walsh transformation of that sum results in a maximally flat Walsh spectrum.

Awater et al. in U.S. Pat. No. 5,862,182 disclose enhancing encoding/transmission of information in an OFDM Wireless Local Area Network (WLAN) system using complementary codes. The complementary codes are converted into phase vectors and the resulting phase vectors are then used to modulate respective carrier signals. The modulated result is then transmitted to a receiver which decodes the received signals to recover the encoded information.

Awater et al. in U.S. Pat. No. 6,005,840 disclose a combined complementary encoder and modulation WLAN system for an OFDM transmitter system that combines complementary coding and modulation and exploits the similarity of their mathematical structure to reduce implementation complexity. Additionally, the combined complementary encoder and modulation system can be modified to provide scalability, which allows a transmitter to operate in various transmission environments.

Unlike conventional spread-spectrum systems, impulse radio systems typically do not employ time-hopping codes for the purpose of energy spreading. This is because the monocycle pulses themselves have an inherently wide bandwidth. Instead, the impulse radio systems use the time-hopping codes primarily for channelization, energy smoothing in the frequency domain, and interference suppression.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hopping code should be steeply peaked, with small side-lobes. Maximally peaked time-hopping code autocorrelation yields optimal acquisition and synchronization properties for communications, radar and positioning applications.

Specialized coding techniques can be employed to specify temporal and/or non-temporal pulse characteristics to produce a pulse train having certain spectral and/or correlation properties. As stated above, coding provides a method of establishing independent communication channels. Specifically, families of time-hopping codes can be designed such that the number of pulse coincidences between two pulse trains produced by any two codes will be no more than some maximum number (e.g., four), regardless of the time offset between the two pulse trains simultaneously arriving at an impulse radio receiver. Coding can also be used to facilitate signal acquisition. Specifically, coding techniques can be used to produce pulse trains with a desirable main-lobe-to-side-lobe ratio and to reduce acquisition algorithm search space.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. These components and subcomponents are also referred to as frames and subframes. A discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics Using Codes," application Ser. No. 09/638,153 and "A Method and Apparatus for Mapping Pulses to a Non-Fixed Layout," application Ser. No. 09/638,151, both filed on Aug. 15, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/638,154, filed Aug. 15, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/637,878 filed Aug. 15, 2000, and incorporated herein by reference.

The signal of a coded pulse train can be generally expressed by:

$$s_{tr}^{(k)}(t) = \sum_j (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)^{f_j(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the $j^{th}$ pulse of the $k^{th}$ transmitter, and $T_j^{(k)}$ is the coded time shift of the $j^{th}$ pulse of the $k^{th}$ transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register (s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/638,150, filed Aug. 15, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in a co-owned, co-pending application, titled "A Method and Apparatus for Specifying Pulse Characteristics using a Code that Satisfies Predefined Criteria," application Ser. No. 09/638,152, filed Aug. 15, 2000, and incorporated herein by reference.

One of the limitations of coding techniques like those described above is that they tend to produce a limited number of codes having desirable correlation properties. Because UWB technology is applicable to a wide variety of applications including communications, radar, and positioning, large numbers of codes are required to support large numbers of impulse radio systems. Accordingly, there exists a need for a coding method capable of generating large numbers of codes having desirable correlation properties.

SUMMARY OF THE INVENTION

The present invention provides a method and apparatus for generating codes that may also be referred to as number sequences, which have desirable correlation properties for use by UWB, CDMA, TDMA, FDMA, or OFDM systems. The generated codes can be used to specify temporal and non-temporal signal characteristics including pulse position in time, amplitude, width, type, phase, phase difference, frequency, spreading code, etc. The invention includes methods for generating the codes, apparatuses employing the codes, and methods for employing the codes. The invention involves defining a signal characteristic value layout and mapping a generated code to the defined value layout, where a signal comprises a pulse or a conventional (non-impulse) radio signal, as appropriate for the intended system. A code or a family of codes may be generated in accordance with a specific mathematical algorithm comprising a sequence of steps. Code generation may be in real time by a system employing the code or in non-real time, for example, generated by a computer and stored in a memory storage device for use by the system. Codes generated in accordance with the invention can be used for channelization purposes or for any other purpose such as, for example, energy spreading.

One aspect of the invention involves an algorithm for generating a family of codes, and comprises the steps of:

specifying a prime number, p, having magnitude greater than 3 and an associated Galois field, GF(p);

selecting a first primitive element of GF(p), α, and a second primitive element of GF(p), β, wherein α=β or α≠β;

defining a family of p+1 polynomials, wherein k is an integer and $0 \leq k \leq p$, wherein $f_k(x) = \text{mod}_p(x^2 + x + k)$ when k<p and $f_k(x) = \text{mod}_p(x+1)$ when k=p;

defining a family of p+1 matrices, wherein each matrix, $A^{(k)}$, has dimension (p−1)×(p−1) and the element of row i in column j of matrix $A^{(k)}$, $A^{(k)}_{ij}$, is defined to have a first state when $f_k(\alpha^j) = \text{mod}_p(\beta^i)$ and is otherwise defined to have a second state; and producing a family of p+1 number sequences, wherein the values of members of each number sequence, $S_k$, are determined in accordance with the elements of a corresponding matrix, $A^{(k)}$, of said family of p+1 matrices.

In one exemplary embodiment, producing a family of p+1 number sequences comprises the steps of:

enumerating the position of each element $A^{(k)}_{ij}$ within each matrix $A^{(k)}$, wherein said element is assigned a position number, $n_{ij} = j \times (p-1) + i$; and producing in accordance with each matrix, $A^{(k)}$, a number sequence, $S_k$, wherein the values of the members of said number sequence are the position numbers of the elements in said matrix having said first state.

In another exemplary embodiment, producing a family of p+1 number sequences comprises the step of:

producing in accordance with each matrix, $A^{(k)}$, a number sequence, $S_k$, having members in accordance with each column j of said matrix, wherein the value of a member is either the row index, i, of the element $A^{(k)}_{ij}$ within said column j having said first state or null when all elements within said column j have said second state.

In one exemplary embodiment, the produced codes are mapped to a value layout having $p^2-2p+1$ values that corresponds to a value layout for a pulse characteristic, which can be a temporal pulse characteristic or a non-temporal pulse characteristic. In another exemplary embodiment, the value layout corresponds to a layout for one of a conventional (non-impulse) radio signal frequency, phase, or amplitude characteristic. In still another exemplary embodiment, the value layout corresponds to a value layout of spreading codes. In each of these embodiments, the produced codes have a maximum autocorrelation value that is less than or equal to 4 for any nonzero offset and a maximum cross-correlation value that is less than or equal to 4 for any offset when correlated against another code in the produced code family.

Previous coding methods for generating families of codes having desirable correlation properties generate codes that specify the presence of a signal in each component of a value layout, such that each code in a code family specifies the same number of signal characteristics as every other code in the code family. Using the method of the invention, code families may include codes that specify a signal is not present in at least one but no more than two of components when mapped to a value layout, such that a code in a code family may specify a different number of signal characteristics than another code in the code family.

Thus, a second aspect of the invention relates to a method for generating a code family comprising the steps of:

defining a signal characteristic layout having n components that are each subdivided into m subcomponents, wherein m and n are positive integers; and generating a code family, wherein at least one code of the code family specifies that a signal is not present in at least one of said components but no more than two of said components when mapped to said signal characteristic value layout.

Because previous coding methods for generating families of codes having desirable correlation properties generate codes that specify the same number of signal characteristics as every other code in the code family, the memory storage requirement for each code in a generated code family is the same as for every other code in the code family. Because the method of the invention can generate a code family having codes that specify different numbers of signal characteristics than other codes in the code family, an opportunity exists to compress codes in order to reduce the memory storage requirement of a code family. Thus, a third aspect of the invention relates to a method of code compression comprising the steps of:

enumerating the position of each element, $A_{ij}$, of a matrix, A, having n rows and m columns, said matrix corresponding to a code that specifies a signal is not present in at least one component when mapped to a signal characteristic value layout, wherein each said element is assigned a position number, $n_{ij}=j \times n+i$, wherein $0 \leq i \leq (n-1)$ and $0 \leq j \leq (m-1)$; and storing in an array the assigned position number of each said element $A_{ij}$ of said matrix A that specifies that a signal is present in a component when mapped to a signal characteristic value layout.

In one embodiment of the invention, the array is referred to as an occupancy array that specifies the subcomponents within a time layout in which a pulse is to be placed. One skilled in the art will understand that a similar array can be used to specify non-temporal pulse characteristics or a characteristic of a conventional (non-impulse) radio signal as appropriate for the system employing the code.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same feature.

FIG. 12 illustrates the code matrix $A^{(k)}$ for each code k in the code family for Example 1.

FIG. 15 illustrates occupancy arrays for Example 3.

DETAILED DESCRIPTION OF THE INVENTION

Overview

Figure 1:
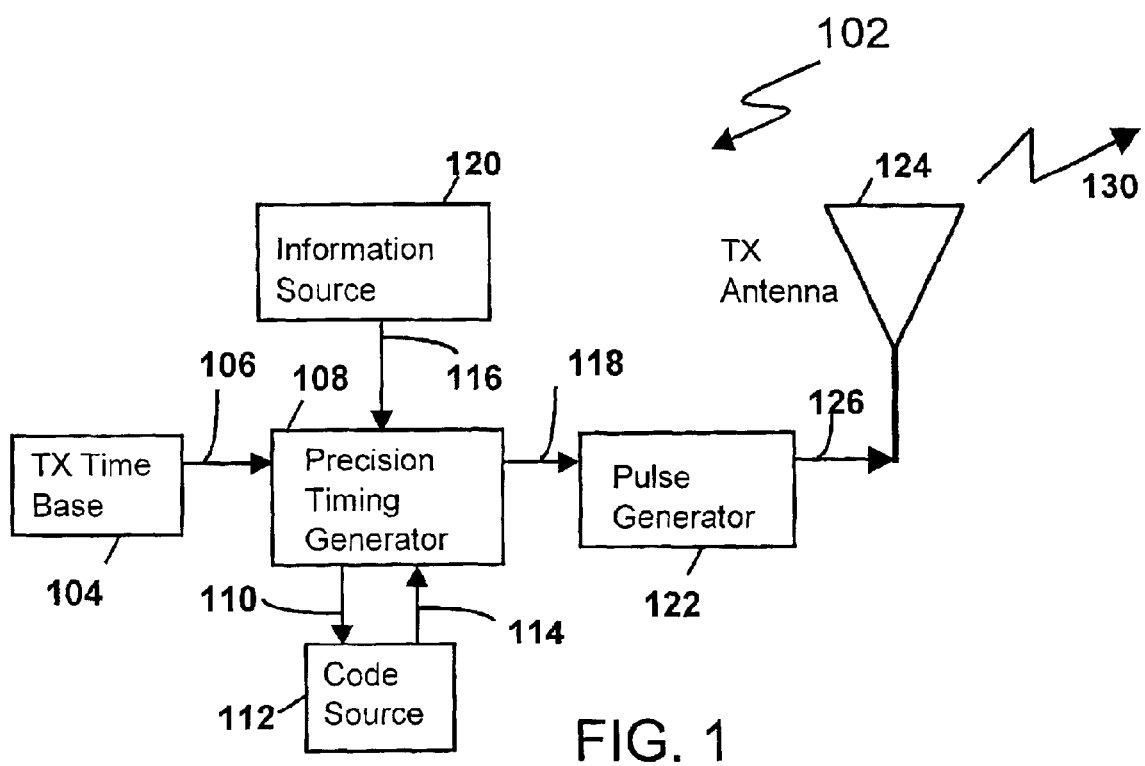
FIG. 1 illustrates a block diagram of an exemplary impulse transmitter to employ the invention.

The present invention provides a method and apparatus for generating and using codes that may be referred to as number sequences, which have desirable correlation properties for use in UWB, CDMA, TDMA, FDMA, or OFDM systems. The generated codes can be used to specify temporal and non-temporal signal characteristics including pulse position in time, amplitude, width, type, phase, phase difference, frequency, spreading code, etc. The invention involves defining a signal characteristic value layout and mapping a generated code to the defined value layout, where a signal comprises a pulse or a conventional (non-impulse) radio signal, as appropriate for the intended system. A code or a family of codes is generated in accordance with a specific mathematical algorithm comprising a sequence of steps. A code may be generated in real time by a system employing it or in non-real time, for example, generated by a computer and stored in a memory storage device for use by the system.

The preferred embodiment of the present invention is described in terms of mapping the generated codes to characteristics of pulses used in an impulse radio system. It will be apparent to someone skilled in the art that the generated codes may be similarly mapped to characteristics of conventional (non-impulse) radio signals used in CDMA (including Time Division-CDMA), TDMA, FDMA, OFDM and other frequency-hopping or direct sequence systems. Furthermore, the described impulse radio technology is generally applicable to impulse communications systems and various other impulse system applications including but not limited to impulse radar systems and impulse positioning systems. Accordingly, the terminology 'impulse radio' can be generally interchanged with the terminology 'impulse transmission system and impulse reception system'.

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidths approximate a Gaussian shape to a useful degree. Examples of such waveforms include the pulse doublet, pulse triplet, pulse quadlet, or a pulse wavelet set produced by combining two or more pulse waveforms.

In an impulse radio system, pulse spacing may be held constant or may be varied on a pulse-by-pulse basis by information, a code, or both. Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Each pulse in a train of pulses may be delayed a different amount from its respective time base clock position by an individual code delay amount plus a modulation time shift. This modulation time shift is normally very small relative to the code shift.

A pulse train can be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal. Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases.

An exemplary embodiment of an impulse radio transmitter 102 of an impulse radio communication system having an optional subcarrier channel will now be described with reference to FIG. 1. The transmitter 102 comprises a time base 104 that generates a periodic timing signal 106. The time base 104 typically comprises a voltage controlled oscillator (VCO), or the like, having a high timing accuracy and low jitter, on the order of picoseconds (Ps). The control voltage to adjust the VCO center frequency is set at calibration to the desired center frequency used to define the transmitter's nominal pulse repetition rate. The periodic timing signal 106 is supplied to a precision timing generator 108.

The precision timing generator 108 supplies synchronizing signals 110 to the code source 112 and utilizes the code source output 114, together with an optional, internally generated subcarrier signal, and an information signal 116, to generate a modulated, coded timing signal 118. An information source 120 supplies the information signal 116 to the precision timing generator 108. The information signal 116 can be any type of intelligence, including digital bits representing voice, data, imagery, or the like, analog signals, or complex signals.

A pulse generator 122 uses the modulated, coded timing signal 118 as a trigger signal to generate output pulses. The output pulses are provided to a transmit antenna 124 via a transmission line 126 coupled thereto. The output pulses are converted into propagating electromagnetic pulses 130 by the transmit antenna 124.

The impulse radio receiver is typically a direct conversion receiver with a cross-correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise.

Figure 2:
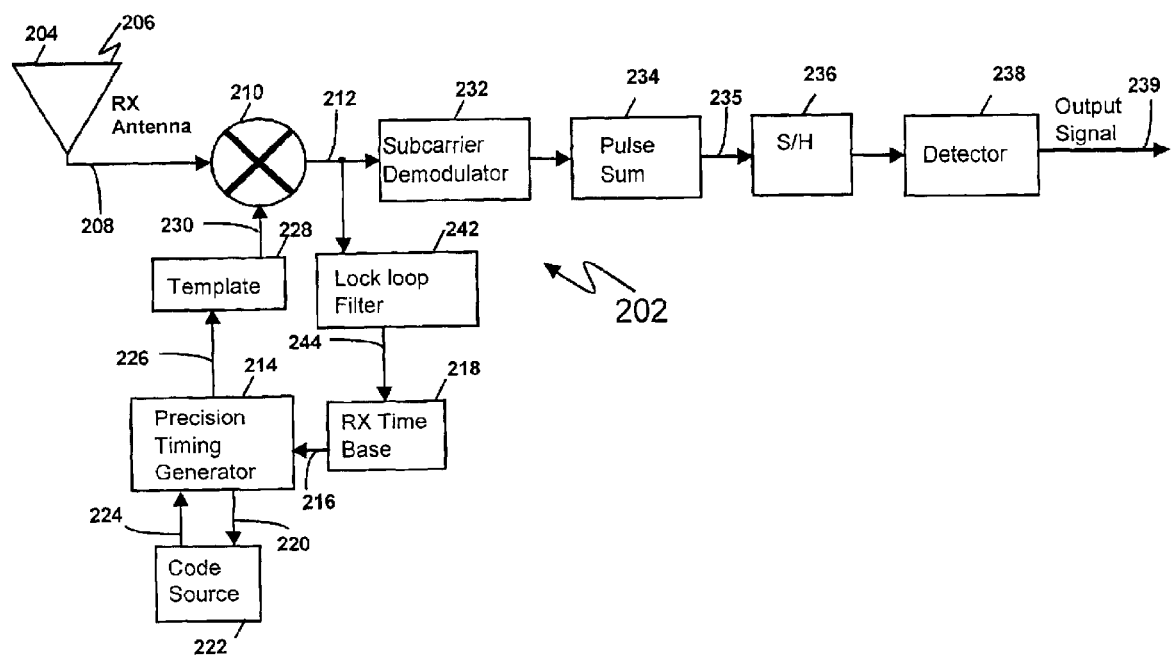
FIG. 2 illustrates a block diagram of an exemplary impulse receiver to employ the invention.

An exemplary embodiment of an impulse radio receiver (hereinafter called the receiver) for the impulse radio communication system is now described with reference to FIG. 2. The receiver 202 comprises a receive antenna 204 for receiving a propagated impulse radio signal 206. A received signal 208 is input to a cross-correlator or sampler 210, via a receiver transmission line, coupled to the receive antenna 204. The cross-correlation 210 produces a baseband output 212.

The receiver 202 also includes a precision timing generator 214, which receives a periodic timing signal 216 from a receiver time base 218. The time base 218 may be adjustable and controllable in time, frequency, or phase, as required by the lock loop, comprising the lowpass filter 242, time base 218, precision timing generator 214, template generator 228, and correlator 210, in order to lock on the received signal 208. The precision timing generator 214 provides synchronizing signals 220 to the code source 222 and receives a code control signal 224 from the code source 222. The precision timing generator 214 utilizes the periodic timing signal 216 and code control signal 224 to produce a coded timing signal 226. The template generator 228 is triggered by this coded timing signal 226 and produces a train of template signal pulses 230 ideally having waveforms substantially equivalent to each pulse of the received signal 208. The code for receiving a given signal is the same code utilized by the originating transmitter to generate the propagated signal. Thus, the timing of the template pulse train matches the timing of the received signal pulse train, allowing the received signal 208 to be synchronously sampled in the correlator 210. The correlator 210 preferably comprises a multiplier followed by a short-term integrator to sum the multiplier product over the pulse interval.

The baseband output 212 from the correlator 210 is coupled to a subcarrier demodulator 232, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 234. A digital system embodiment is shown in FIG. 2. In this digital system, a sample and hold 236 samples the output 235 of the pulse summation stage 234 synchronously with the completion of the summation of a digital bit or symbol. The output of sample and hold 236 is then compared with a nominal zero (or reference) signal output in a detector stage 238 to provide an output signal 239 representing the digital state of the output voltage of sample and hold 236.

The baseband signal 212 is also input to a lowpass filter 242 (also referred to as lock loop filter 242). A control loop, comprising the lowpass filter 242, time base 218, precision timing generator 214, template generator 228, and correlator 210, is used to generate an error signal 244. The error signal 244 provides adjustments to the adjustable time base 218 to position in time the periodic timing signal 226 in relation to the position of the received signal 208.

In a transceiver embodiment, substantial economy can be achieved by sharing part or all of several of the functions of the transmitter 102 and receiver 202. Some of these include the time base 218, precision timing generator 214, code source 222, antenna 204, and the like.

Figure 3A:
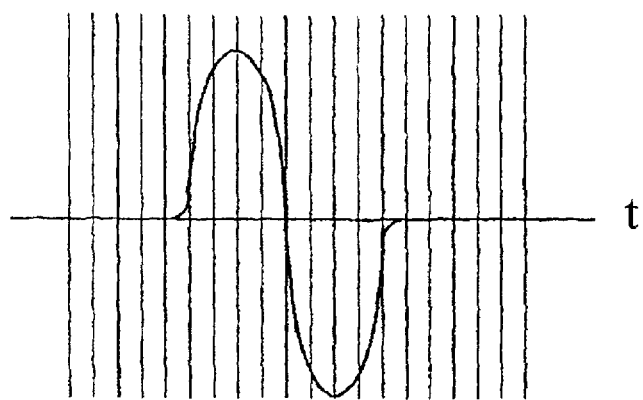
FIG. 3A shows the waveform of a template signal.
Figure 3B:
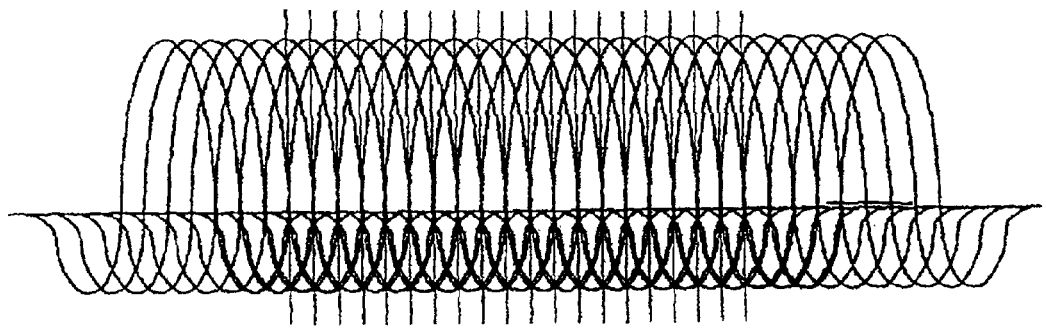
FIG. 3B shows the waveform of a received impulse radio signal at a set of several possible time offsets.
Figure 3C:
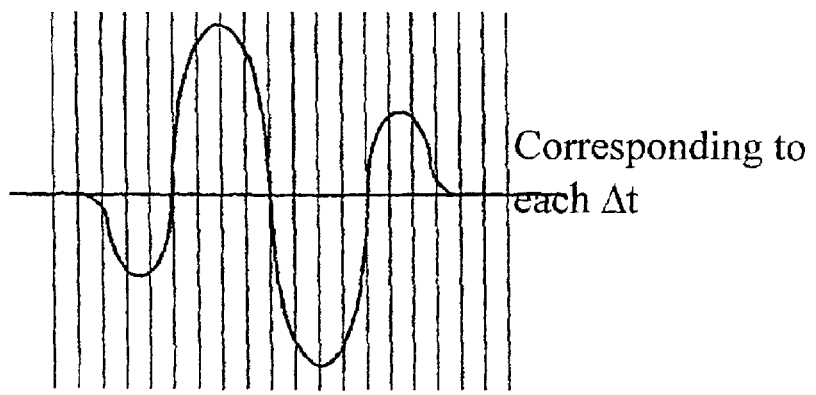
FIG. 3C represents the output of the cross-correlator for each of the time offsets of FIG. 3B.

FIGS. 3A–3C illustrate the cross-correlation process and the correlation function performed by the correlator 210. FIG. 3A shows the waveform of a template signal 230. FIG. 3B shows the waveform of a received impulse radio signal 208 at a set of several possible time offsets. FIG. 3C represents the output of the correlator 210 for each of the time offsets of FIG. 3B.

Figure 4:
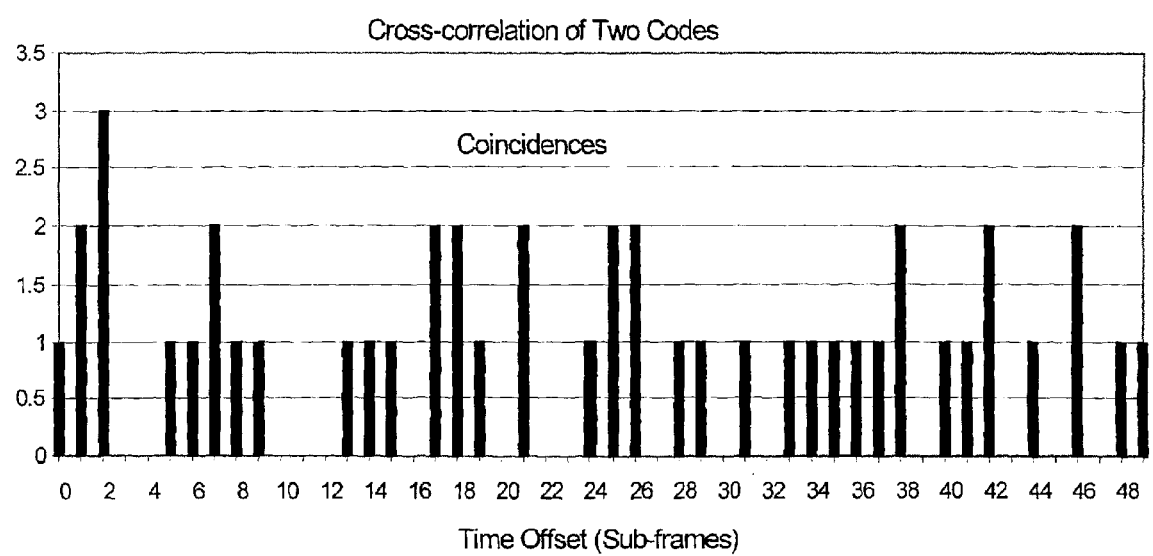
FIG. 4 illustrates cross-correlation of two codes.

The following discussion illustrates the use of coding for channelization purposes, which is consistent with the codes that may be generated in accordance with the present invention. As is well understood in the art, families of codes can be designed such that the number of coincidences between signals specified by any two codes of a code family will be minimal. For example, FIG. 4 depicts cross-correlation properties of two QC codes. Like the codes of the invention, QC codes are guaranteed to have no more than four coincidences when two codes of a code family are cross-correlated. In FIG. 4 it can be seen that the maximum number of coincidences is less than or equal to four. Generally, keeping the number of signal (e.g., pulse) collisions minimal represents a substantial attenuation of the unwanted signal. Coding can also be used to facilitate signal acquisition. For example, coding techniques can be used to produce signals (e.g., pulse trains) with a desirable main-lobe-to-side-lobe ratio. In addition, coding can be used to reduce acquisition algorithm search space.

One of the features of the present invention relates to generating codes having desirable correlation properties. As described in detail below, the present invention includes a method for generating codes where the maximum cross-correlation of any two codes of the generated code family is less than or equal to 4 and the maximum autocorrelation of any code in the code family is less than or equal to 4 for any nonzero offset. Each generated code consists of a sequence of code element values. The method of the invention involves defining a value layout corresponding to the time period over which the pulses are overlaid, or a value layout corresponding to values of another pulse characteristic, e.g., pulse amplitude. A mapping approach maps the code element values to pulse characteristic values as defined in the value layout based on the generated code. In an exemplary embodiment, the code element values of a generated code are mapped to pulse positions in accordance with the defined time value layout and code mapping approach. It will be apparent to someone skilled in the art that the generated codes may be similarly mapped to non-temporal pulse characteristics such as pulse amplitude, pulse width (in time), pulse polarity, and pulse type or to characteristics of conventional (non-impulse) radio signals such as phase, frequency, or the like.

Pulse Characteristic Value Layouts

Pulse characteristic value layouts can be defined to facilitate mapping of codes to pulse characteristics. Such value layouts can be defined in a multitude of ways to accommodate a wide variety of impulse radio system applications. One way to characterize a layout is by specifying a range of pulse characteristic values. Another way to characterize a layout is by specifying discrete pulse characteristic values.

Value Range Layout

One exemplary embodiment involves a pulse characteristic value range layout where a range of pulse characteristic values is divided into smaller and smaller components to achieve a desired component resolution. Thus, each component, subcomponent, or smaller component corresponds to a pulse characteristic value range within the value range layout. A code element value of a generated code can be mapped to a pulse characteristic value range and vice-versa. The exemplary embodiment described below establishes this pulse characteristic value range layout using any of various temporal or non-temporal pulse characteristics.

Figure 5:
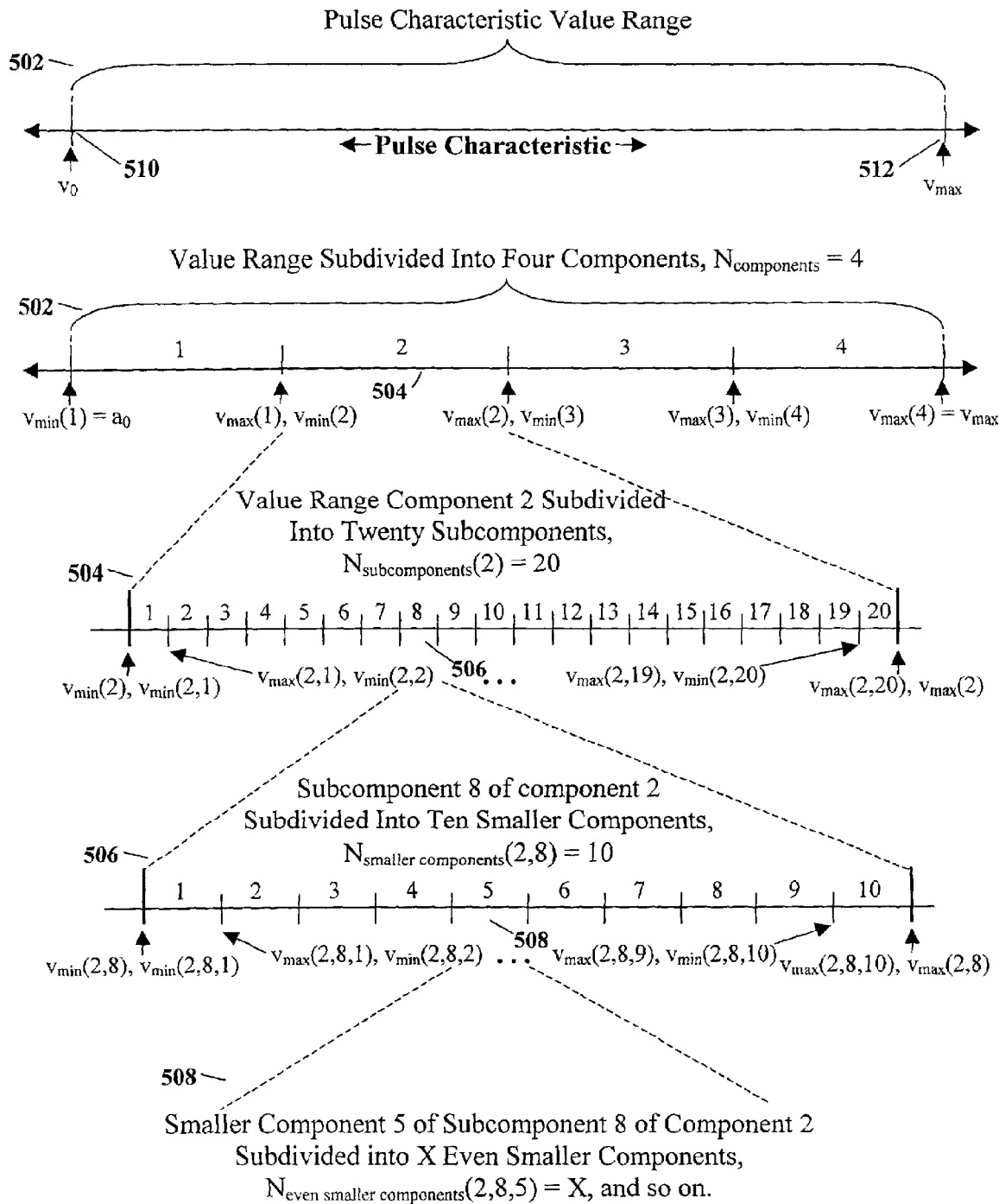
FIG. 5 depicts an exemplary embodiment of pulse characteristic value range layout parameters.

FIG. 5 illustrates an exemplary value range layout which can represent a temporal, non-temporal, or combination of the two, pulse characteristic such as, e.g., timing of a pulse and amplitude. FIG. 5 includes a value range layout 502. The pulse can take on characteristic values between a minimum value $v_0$ 510 and a maximum value $v_{max}$ 512 in layout 502. Layout 502, as shown, can be subdivided into components 504. Components 504 can in turn be divided into subcomponents 506. Subcomponents 506 can in turn be divided into smaller components 508. Smaller components 508 can then be divided into even smaller components, as shown. The process of subdividing components can be repeated, ad infinitum, so that smaller and smaller components can be obtained.

The process of subdividing a layout into components is now described in detail. In particular, FIG. 5 depicts an exemplary embodiment of pulse characteristic value range layout parameters. Specifically, a pulse characteristic value range 502 is shown. As depicted in FIG. 5, two layout parameters, $v_0$ and $v_{max}$, can be specified to define a pulse characteristic value range 502 bounded by a minimum value of $v_0$ and a maximum value of $v_{max}$. A second layout parameter, $N_{components}$, can be specified to divide the value range 502 into one or more components 504 of the same size, or of different sizes, with each component 504 (indexed by the letter n) having a minimum value, $v_{min}(n)$, and a maximum value, $v_{max}(n)$, where n=1 to $N_{components}$.

The number and size of components 504 used in a given layout can be selected for various reasons. For example, the number and size of components 504 can be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, inter alia. When different sized components 504 are employed, minimum and maximum values can be specified for each component 504 indexed by n, wherein the minimum value for a given component, $v_{min}(n)$, equals the maximum value of the preceding component, $v_{max}(n-1)$, or $v_0$, and the maximum value of a given component, $v_{max}(n)$, equals the minimum value for the following component, $v_{min}(n+1)$, or $v_{max}$. When same sized components 504 are employed, the value range is evenly divided such that $v_{max}(n)-v_{min}(n)$ is equal for each component 504 indexed by n.

An array of layout parameters, $N_{subcomponents}$ ($N_{components}$), can be specified to subdivide each component 504 into subcomponents 506 of the same size, or different sizes, with each subcomponent 506 (indexed by m) of the component 504 (indexed by n) having a minimum value, $v_{min}(n,m)$, and a maximum value, $v_{max}(n,m)$, where n=1 to $N_{components}$ and m=1 to $N_{subcomponents}(n)$. As with components 504, the number and size of subcomponents 506 for a given component 504 used in a given value range layout 502 can also be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, etc., and/or for many other reasons. When different sized subcomponents 506 are employed, minimum and maximum values are specified for each subcomponent 506 indexed by m of each component 504 indexed by n, wherein the minimum value for a given subcomponent, $v_{min}(n,m)$, equals the maximum value of the preceding subcomponent, $v_{max}(n,m-1)$, or the minimum value of the component in which the subcomponent resides, $v_{min}(n)$, and the maximum value of a given subcomponent, $v_{max}(n,m)$, equals the minimum value for the following subcomponent, $v_{min}(n,m+1)$, or the maximum value of the component in which the subcomponent resides, $v_{max}(n)$. When same sized subcomponents 506 are employed, components are evenly divided such that $v_{max}(n,m)-v_{min}(n,m)$ is equal for each subcomponent 506 indexed by m of a component 504 indexed by n or for all components such that all subcomponents 506 of a given component 504 are of the same size, wherein subcomponent sizes may vary from component to component or all subcomponents of all components are of the same size depending on the sizes of the components and the numbers of subcomponents in the components.

In a manner consistent with the subdivision of components into subcomponents, additional multi-dimensional arrays of layout parameters can be used to further subdivide subcomponents 506 into smaller components 508 (as shown) of the same or different sizes, ad infinitum, until a smallest desirable component resolution is attained, with components at each resolution level having a minimum value, $v_{min}(n, m, \ldots, a)$, and a maximum value, $v_{max}(n, m, \ldots, a)$, where n=1 to $N_{components}$, m=1 to $N_{subcomponents}(n), \ldots$, and a=1 to $N_{smallest\ components}(n, m, \ldots)$. Such further subdivision of subcomponents into smaller and smaller components enables systems with finer and finer tuning resolution and thus higher and higher fidelity, increases modulation accuracy, and can be useful for other purposes. As with components 504 and subcomponents 506, the number and size of these smaller components 508 can also be tailored, e.g., to meet specific application requirements, to remain within system implementation limits, to achieve one or more of a variety of system characteristics in areas such as performance (i.e., bit rate), reliability (i.e., bit error rate), system-simplicity, ease-of-use, etc., and/or for many other reasons. When different sizes of these smaller components 508 are employed, minimum and maximum values are specified for each smaller component 508 (indexed by a), wherein the minimum value for a component, $v_{min}(n, m, \ldots, a)$, equals the maximum value of the preceding component, $v_{max}(n, m, \ldots, a-1)$, or the minimum value of the next higher level component in which the component resides, $v_{min}(n, m, \ldots)$, and the maximum value of a given component, $v_{max}(n, m, \ldots, a)$, equals the minimum value for the following component, $v_{min}(n, m, \ldots, a+1)$, or the maximum value of the next higher level component in which the component resides, $v_{max}(n, m, \ldots)$. When same sized smaller components 508 are employed, the next higher level components 506 are evenly divided such that $v_{max}(n, m, \ldots, a)-v_{min}(n, m, \ldots, a)$ is equal for each smaller component 508 indexed by a of a given next higher level component or for all next higher level components such that all components of a given next higher level component are of the same size, wherein component sizes may vary from next higher level component to next higher level component or all components of all higher level components are of the same size depending on the sizes of the next higher level components and the numbers of components in the next higher level components.

At the top of FIG. 5, the pulse characteristic value range 502 is depicted as bounded by endpoints of $v_0$ and $v_{max}$. Beneath this illustration an equivalent value range 502 is shown that has been subdivided into four components 504 by setting the layout parameter $N_{components}$ to a value of four (4), and the size of each component has been established by setting the minimum and maximum values of each component, $v_{min}(n)$ and $v_{max}(n)$, where n=1 to 4. An enlargement of the second component 504 is then shown where the component has been subdivided into twenty subcomponents 506 by setting the layout parameter $N_{subcomponents}(2)$ to a value of twenty (20), and the size of each subcomponent 506 has been established by setting the minimum and maximum values of the subcomponents 508 within component two 504, $v_{min}(n,m)$ and $v_{max}(n,m)$, where n=2 and m=1 to 20. As illustrated, there are 20 subcomponents 506 in component 504, indexed by n=2, and m=1 to 20, labeled $v_{min}(2,1)$ and $v_{max}(2,20)$.

An enlargement of the eighth subcomponent 506 of component two 504 is then shown where the subcomponent 506 has been subdivided into ten smaller components 508 by setting the layout parameter $N_{smaller\_components}(2,8)$ to a value of ten (10), and the size of each smaller component 508 has been established by setting the minimum and maximum values of the smaller components within subcomponent eight 506 of component two 504, $v_{min}(n,m,l)$ and $v_{max}(n,m,l)$, where n=2, m=8, and l=1 to 10. As illustrated, there are 10 smaller components 508 in subcomponent 506, indexed by n=2, m=8, and l=1 to 10, labeled $v_{min}(2,8,1)$ and $v_{max}(2,8,10)$.

It is then shown that these smaller components 508 could be subdivided into x even smaller components (whose size is not shown) using another layout parameter [e.g., $N_{even\_smaller\_components}(2,8,5)=x$], which can be further subdivided, ad infinitum. Also not shown in FIG. 5, are enlargements of the other components 504, subcomponents 506, and smaller components 508, which in an exemplary embodiment could also contain twenty subcomponents 506, ten smaller components 508, and x even smaller components, respectively.

By subdividing a value range layout into levels of smaller and smaller components and by varying or not varying the size of components at different levels, a multitude of different layout permutations can be defined. Examples of such permutations are included in a co-owned patent application entitled "Method for Specifying Pulse Characteristics Using Codes", application Ser. No. 09/638,153, filed Aug. 15, 2000, which was previously incorporated by reference. It should be noted, however, that other layouts including, e.g., infinite combinations of similar and different sized components, could also be used within the scope of the present invention. It should also be noted that the pulse characteristics could include any of various temporal, non-temporal, or both temporal and non-temporal characteristics.

In a preferred embodiment of the present invention, a value range layout consists of n same-sized components (or frames) each consisting of n same-sized subcomponents (or subframes). In another embodiment of the present invention, a value range layout consists of n same-sized components (or frames) each consisting of m same-sized subcomponents (or subframes).

Non-Allowable Regions Within Value Range Layouts

Figure 6:
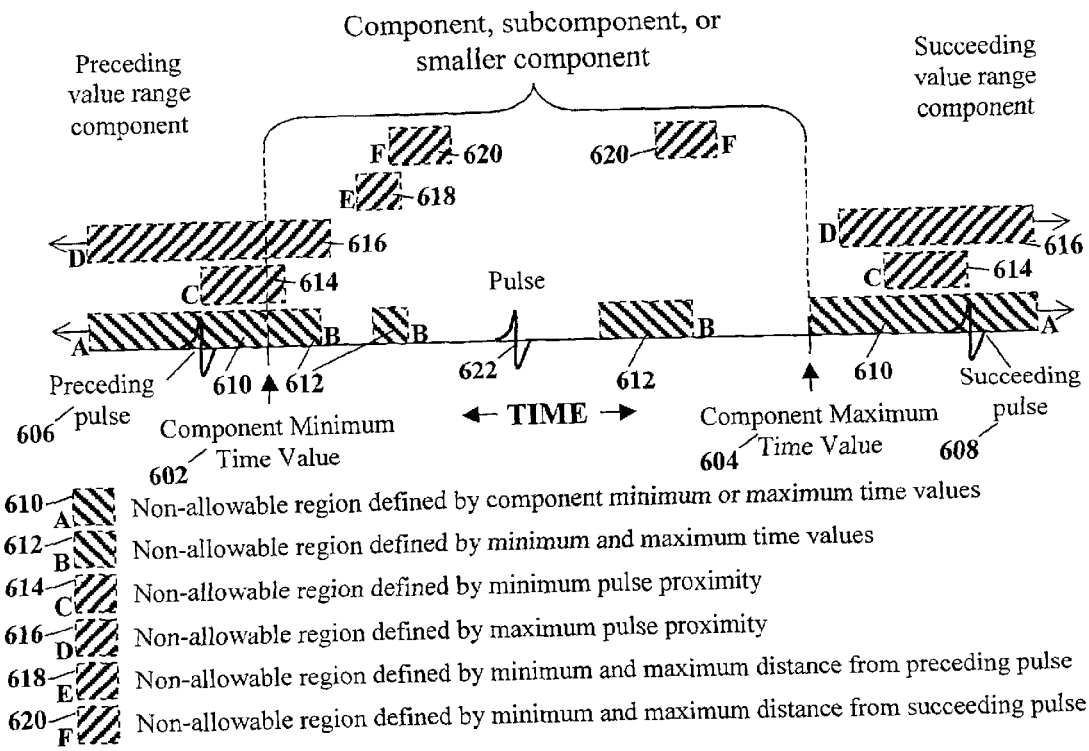
FIG. 6 illustrates non-allowable regions in a characteristic value range layout within which a characteristic value is not allowed.
Figure 6:
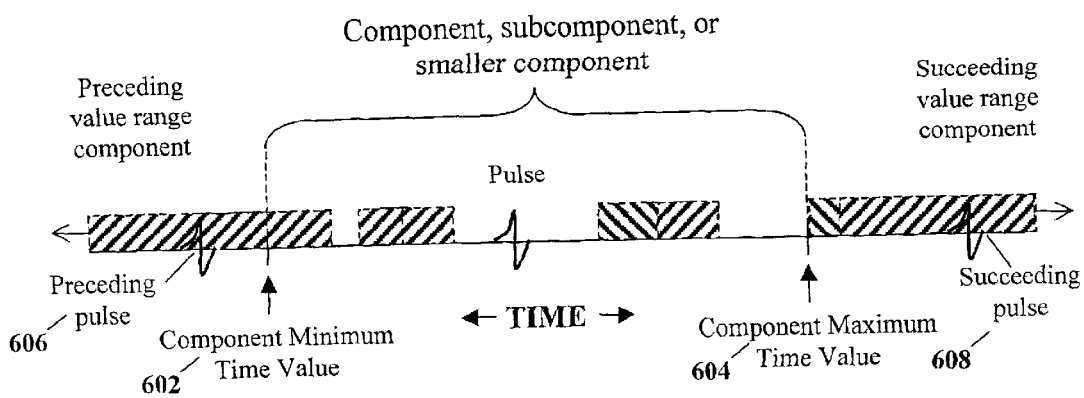

As shown in FIG. 6, one or more non-allowable regions can be defined in a characteristic value range layout within which a characteristic value is not allowed. A non-allowable region may fully or partially include one or more components, subcomponents or smaller components. A non-allowable region can be based solely on value position within a component, subcomponent, or smaller component. For example, a non-allowable region can be defined such that a pulse characteristic value cannot be less than the minimum value or greater than the maximum value of a given component. Non-allowable regions are further described in co-owned, co-pending patent application entitled "A Method for Specifying Non-Allowable Pulse Characteristics", application Ser. No. 09/638,154, filed Aug. 15, 2000, which was previously incorporated by reference.

Discrete Value Layouts

Figure 7A:
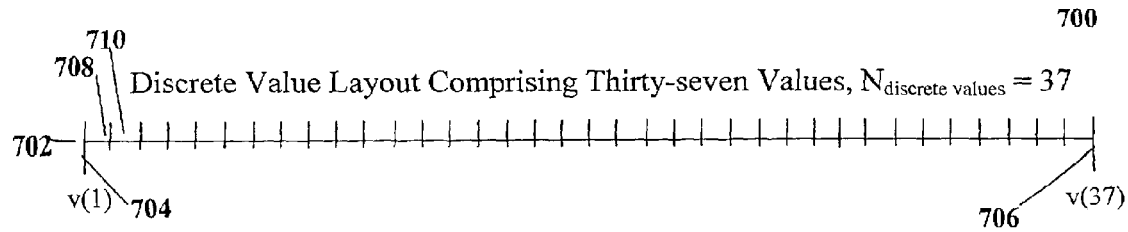
FIGS. 7a and 7b illustrate evenly and not evenly distributed discrete layout values respectively.
Figure 7B:
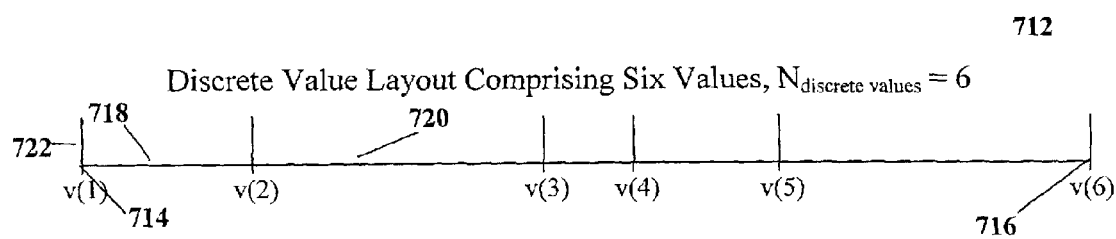

Another exemplary embodiment of the present invention defines a layout of pulse characteristic values by specifying a layout of discrete characteristic values to which individual code elements can map. As depicted in FIGS. 7a and 7b, a layout parameter, $N_{discrete\ values}$ can be specified to identify some number of discrete values within a layout having a value, v(n), with an index n, where n=1 to $N_{discrete\ values}$. Discrete values may, e.g., be evenly distributed, or not, as depicted in FIGS. 7a and 7b, respectively.

Beginning with FIG. 7a, the diagram 700 illustrates an exemplary embodiment in which thirty-seven (37) evenly-distributed (the first two width values are labeled 708, 710) discrete characteristic values, v(1) 704 through v(37) 706, are shown. In the exemplary embodiment, the number of discrete values 704, 706 within layout 702 is thirty-seven (37) and is referred to as $N_{discrete\ values}=37$.

FIG. 7b depicts, in an exemplary embodiment, a diagram 712 illustrating six (6) non-evenly-distributed (the first two width values are labeled 718 and 720) discrete characteristic values, v(1) 714 through v(6) 716. In the exemplary embodiment, the number of discrete values 714, 716 within layout 722 is six (6) and is referred to as $N_{discrete\ values}=6$.

Examples of temporal and non-temporal discrete value layouts are included in a co-owned, co-pending patent application entitled "Method for Specifying Pulse Characteristics Using Codes", application Ser. No. 09/638,153, filed Aug. 15, 2001, which was previously incorporated by reference.

Combinations of Value Range and Discrete Value Layouts

In one exemplary embodiment of the present invention, the discrete value layout embodiments illustrated in FIGS. 7a and 7b, described above, can be combined with an embodiment of a value range layout such as, e.g., the value range layout 502 of FIG. 5, enabling code element values to specify, e.g., a component 504 within the value range layout 502 and a discrete value within the component 504 (not shown). The use of a combination of the discrete value layout and value range layout approaches is shown in FIG. 8.

Figure 8:
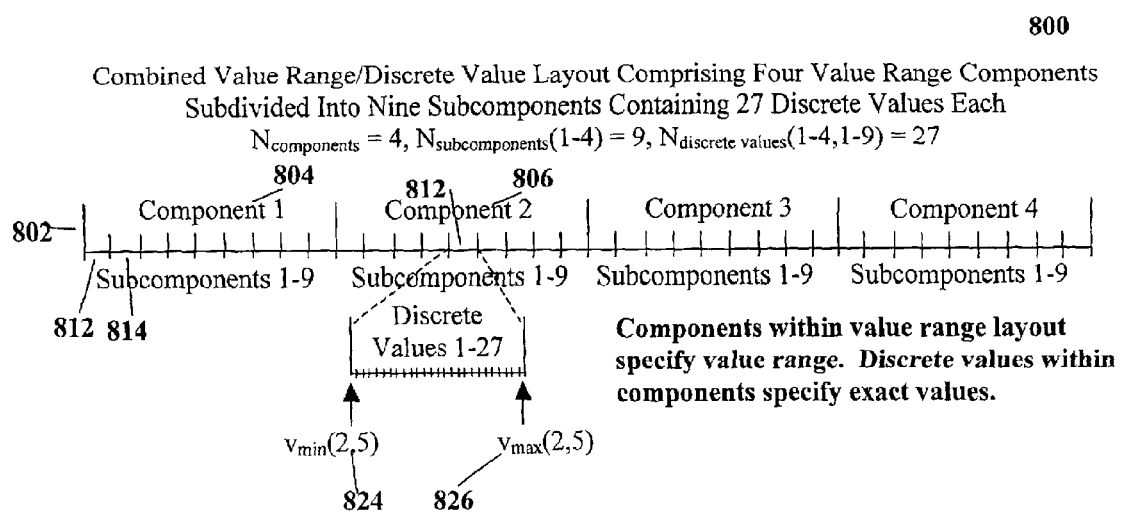
FIG. 8 depicts an exemplary embodiment of the invention using a combination of a discrete value layout and a value range layout.

Specifically, FIG. 8 is a diagram 800 showing an exemplary embodiment of the invention using a combination of a discrete value layout similar to the one depicted in FIG. 7a, and a value range layout similar to that shown in FIG. 5. Referring now to FIG. 8, a value range layout 802 is subdivided into four (4) components (the first two are labeled 804, 806) that are subdivided into nine (9) subcomponents (the first two are labeled 812, 814). Component 806 is shown with a subcomponent 812 which has been further expanded to illustrate discrete values from $v_{min}(2,5)$ 824 to $v_{max}(2,5)$ 826. Thus, as illustrated, each subcomponent 812 contains 27 discrete values. The layout 802 of the exemplary embodiment of diagram 800 could, e.g., be specified by setting $N_{components}=4$, $N_{subcomponents}(1-4)=9$, and $N_{discrete\ values}(1-4,1-9)=27$.

Code Mapping

A multitude of exemplary code mapping embodiments may be employed in conjunction with pulse characteristic value layouts to accommodate impulse radio system implementation requirements and to optimize system performance for specific applications. The coding method of the present invention can be applied to the coding methods for specifying temporal and non-temporal pulse characteristics, as described in commonly owned, co-pending applications titled "A Method and Apparatus for Positioning Pulses in Time," application Ser. No. 09/638,150, filed Aug. 15, 2000, which was previously incorporated by reference, and "A Method for Specifying Non-Temporal Pulse Characteristics," application Ser. No. 09/638,192, filed Aug. 15, 2000, which is incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a code generated in accordance with the present invention may be used to specify value range components within a layout and a nested pseudorandom code may be used to randomly position pulses within the value range components. With this approach, correlation properties of the code are maintained since the pulse positions specified by the nested code reside within the value range components specified by the designed code, while the random positioning of the pulses within the components results in particular spectral properties. A method for applying code combinations is described in a co-owned, co-pending application, titled "A Method and Apparatus for Applying Codes Having Pre-Defined Properties," application Ser. No. 09/638,046, filed Aug. 15, 2000, which was previously incorporated by reference.

Code Generation

Figure 9:
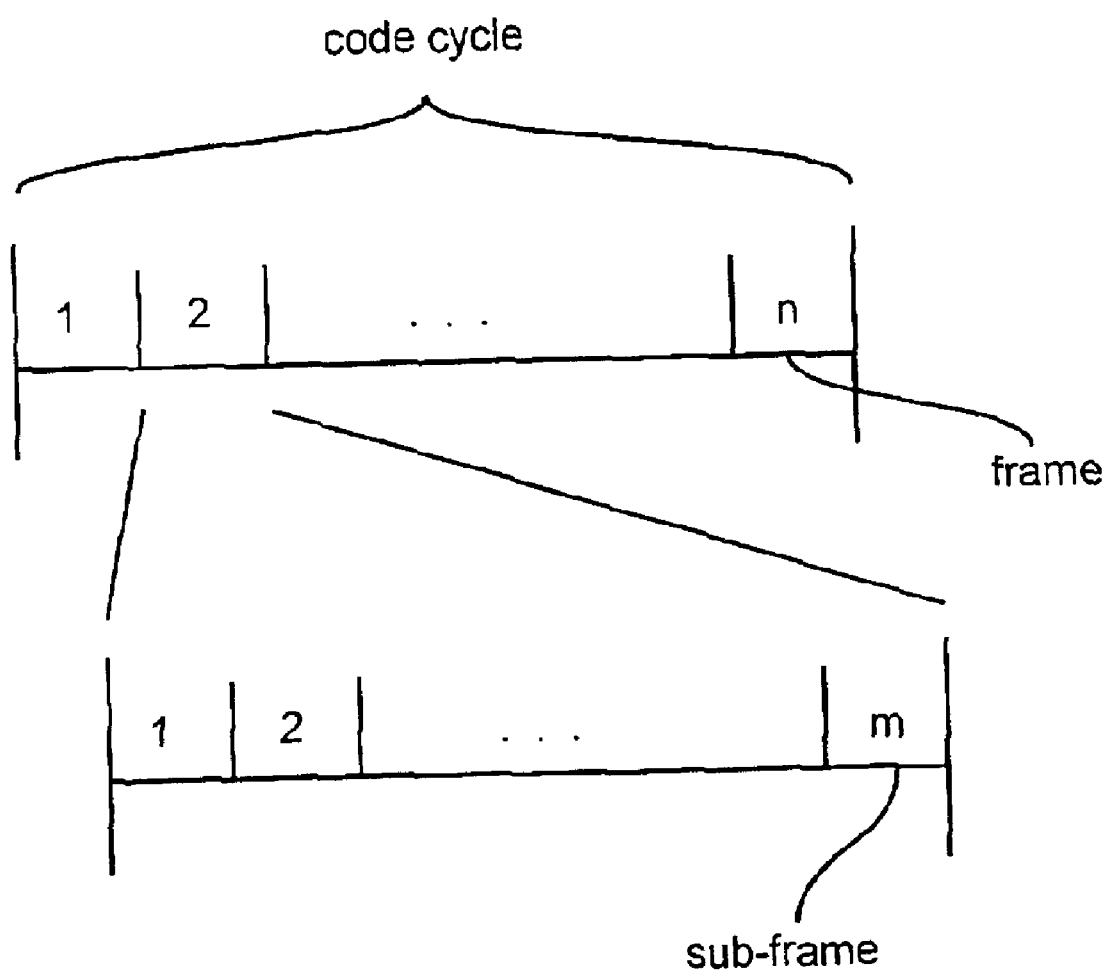
FIG. 9 illustrates a layout divided into n time frames each subdivided into m subframes.

As stated above, the present invention relates to a code generation method that can provide a large number of codes having desirable correlation properties. The codes are defined relative to an m×n matrix, where n denotes the columns of the matrix that correspond to the components of a pulse characteristic value layout, and m denotes the rows of the matrix that correspond to the subcomponents within the components of the layout. Thus, a pulse characteristic specified by a element value within a given matrix cell (i,j) maps to the $i^{th}$ subframe of the $j^{th}$ frame, where index i has values from 1 to n and index j has values from 1 to m, as shown in FIG. 9. Those skilled in the art will recognize that the assignment of matrix columns to layout components and matrix rows to layout subcomponents is an arbitrary decision. Alternatively, matrix rows could be assigned to layout components and matrix columns assigned to layout subcomponents, in which case certain equations and methods of the current invention described below would be modified in accordance with the alternative assignment.

In accordance with the current invention, families of codes having any code length (i.e., n×m) may be generated where the maximum cross-correlation between any two codes in a code family is less than or equal to 4, and the autocorrelation of any code in a code family is less than or equal to 4 when disregarding the zero offset. The zero offset of an autocorrelation occurs whenever a code (or coded signal) is perfectly aligned with a copy of itself in which case all code elements (or signals/signal portions) coincide.

Conventional coding schemes apply at least one pulse characteristic to a subcomponent of each layout component. For example, time-hopping codes typically position pulses in one and only one subframe within each frame of a defined time layout. According to a unique property of the coding method of the present invention, one or more codes within a generated code family may specify a signal (e.g., pulse) is not present in as many as two of the components (or frames) within the defined layout. Thus, the present invention is capable of producing codes that can be used for purposes such as, for example, interference sampling or to facilitate a signal acquisition scheme. A method of sampling interference that may leverage such empty components is described in co-owned, co-pending patent application Ser. No. 09/879,198 titled "A Method and Apparatus for Receiving a Plurality of Time Spaced Signals", filed Jun. 13, 2001, which is incorporated herein by reference.

Codes of the present invention are typically mapped to a repeating value layout such that one instance of the code specifies, for example, one instance of a pulse train, which repeats. Accordingly, an instance of a code may be referred to as its code cycle. In accordance with the unique property of the code generation method of the present invention, each code may be expressed using an occupancy array C, which specifies only those subcomponents in which a signal is to be present in the code cycle. Specifically, the elements of the occupancy array C of a code identify the subcomponents in the code cycle of the code containing a signal, or signal portion, where the subcomponents are counted successively from the beginning of the code cycle. For example, if a code has 3 components each having 3 subcomponents (i.e., a 3×3 code), the code has 9 total subcomponents that may be consecutively numbered from 0 to 8. Continuing the example, an occupancy array C=[0, 4, 8] maps to subcomponent 0 (i.e., the first subcomponent in the first component), subcomponent 4 (i.e., the second subcomponent in the second component), and subcomponent 8 (i.e., the third subcomponent in the third component). Thus, the occupancy array specifies that a signal is not present in subcomponents 1, 2, 3, 5, 6, and 7. If the signal is a UWB signal, the occupancy array C=[0, 4, 8] indicates that subcomponents 0, 4, and 8 each contain a pulse and that subcomponents 1, 2, 3, 5, 6, and 7 contain no pulses. The remaining description of the invention assumes use of an occupancy array. However, those skilled in the art will understand that an occupancy array is only one approach that can be used to facilitate mapping of a code to a value layout and that various alternatives can be used within the scope of the current invention such as those described in co-owned co-pending application titled "Method for Specifying Pulse Characteristics Using Codes," application Ser. No. 09/638,153, filed on Aug. 15, 2000, which was previously incorporated by reference. Additionally, those skilled in the art will understand that the occupancy array can be employed in a different manner than described above; for example, elements may be stored in a different order to accommodate an alternative value layout mapping scheme.

The coding method of the present invention provides code families having ((p−1)×(p−1)) codes, where p is any prime number greater than 3. Each generated code family has p+1 codes. For each code in a code family of the present invention, each component of the code cycle has at most one signal (e.g., a pulse) or signal portion, and no more than two components have no signal present. In other words, each component of the code cycle has zero subcomponents or one subcomponent having a signal present, and zero, one, or two components in the code cycle have no signal present.

Figure 10:
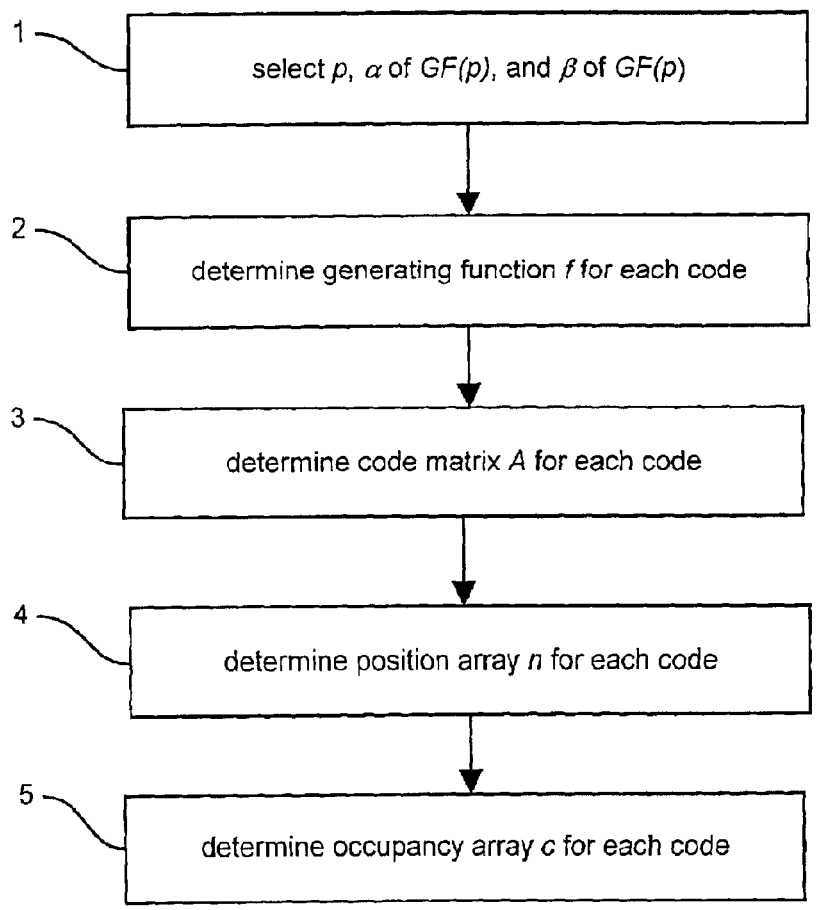
FIG. 10 illustrates a flow diagram for generating all codes in a code family in accordance with the design.

FIG. 10 illustrates a flow diagram for generating a code family in accordance with the present invention.

In block 1, several values are selected to generate a code family, namely: a prime number p>3, which defines the length of each code and the Galois field GF(p) of order p; a primitive element α of GF(p); and a primitive element β of GF(p). The two primitive elements α and β need not be distinct. The primitivity of α and β may be verified using any well-known method.

In block 2, a generating function f is defined for each code in the code family. Generating function $f^{(k)}$ is a polynomial defined for code k, where $0 \leq k \leq p$, as follows:

$$f^{(k)}(x) = \begin{cases} \mathrm{mod}_p(x^2 + x + k) & \text{if } 0 \leq k \leq p-1 \\ \mathrm{mod}_p(x+1) & \text{if } k = p \end{cases}$$

where x is a real number. The number of generating functions defined is p+1. The function $\mathrm{mod}_p(x)$ performs the function of modulo p on x and is defined to be the remainder when x is divided by p. For example, if p=5, $\mathrm{mod}_5(1)=1$, $\mathrm{mod}_5(5)=0$, $\mathrm{mod}_5(7)=2$, $\mathrm{mod}_5(-1)=4$.

In block 3, a matrix A is determined for each code in the code family. The matrix $A^{(k)}$ for code k has size (p−1)×(p−1) and has elements $A_{ij}^{(k)}$ given by:

$$A_{ij}^{(k)} = \begin{cases} 1 & \text{if } f^{(k)}(\alpha^j) = \mathrm{mod}_p(\beta^i) \\ 0 & \text{otherwise} \end{cases}$$

where $0 \leq k \leq p$, and i and j are integers, $0 \leq i,j \leq p-2$. A value of 1 for an element of $A^{(k)}$ corresponds to a signal, or signal portion, being present in a subcomponent in the code cycle, and a value of 0 for an element of $A^{(k)}$ corresponds to no signal portion being present in a subcomponent of the code cycle. Instead of using elements of 0 and 1 for the matrix $A^{(k)}$, any elements having a first state and a second state, respectively, can be employed.

Figure 11:
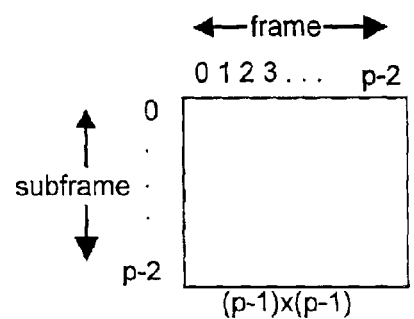
FIG. 11 illustrates a matrix $A^{(k)}$ for a code k having dimension $(p-1) \times (p-1)$.

FIG. 11 illustrates a matrix $A^{(k)}$ for a code k, which has size (p−1)×(p−1). The code cycle of code k has (p−1) components and (p−1) subcomponents. The columns of the matrix $A^{(k)}$ correspond to the (p−1) components in the code cycle of code k and are numbered from 0 to p−2. The rows of the matrix $A^{(k)}$ correspond to the (p−1) subcomponents within each of the (p−1) components in the code cycle of code k and are numbered from 0 to p−2.

In block 4 of FIG. 10, a position array P is determined for each code in the code family. The position array $P^{(k)}$ for code k is determined as follows:

$$P_r^{(k)} = \begin{cases} j(p-1)+i & \text{if } A_{ij}^{(k)} = 1 \\ 0 & \text{if } A_{ij}^{(k)} = 0 \end{cases}$$

where r=j(p−1)+i and $0 \leq i,j \leq (p-2)$. Then $0 \leq r \leq (p^2-2p)$ and $|P^{(k)}|=(p-1)^2$, where |X| indicates the cardinality (i.e., the number of elements) of the array X. Each element in the position array P corresponds to a subcomponent in the code cycle of the code. Each element in the position array P having a zero value corresponds to a subcomponent in the code cycle not having a signal. Each element in the position array P having a nonzero value corresponds to a subcomponent in the code cycle having a signal, where the nonzero value equals the number of the consecutively numbered subcomponent in which the signal is present. One skilled in the art will recognize that 'position array' would be 'amplitude array', 'frequency array', or whatever name would be appropriate for an array used to specify code element values that map to another signal characteristic in accordance with the current invention.

In block 5, an occupancy array C is determined for each code k in the code cycle. The occupancy array C is based on the position array P from block 4 and is generated by removing the zeros from the position array P. The size of the occupancy array $C^{(k)}$ for code k is $p-3 \leq |C^{(k)}| \leq p-1$. The values for the elements in the occupancy array C are the numbers of the consecutively numbered subcomponents in a code cycle of the code in which a signal is present. One skilled in the art will recognize that the steps described for blocks 4 and 5 of FIG. 10 can be performed in various other ways and that the producing of an occupancy array from a matrix can be generally treated as a single step. Furthermore, as with the terminology 'position array', the terminology 'occupancy array' can be similarly replaced as would be appropriate to specify a non-temporal pulse characteristic or a conventional (non-impulse) radio signal characteristic.

Instead of generating all codes in a code family, one, two, or any number of codes in a code family can selectively be generated by choosing the appropriate number of generating functions f in block 2 and following through with blocks 3 through 5. For example, if one code is desired, a single generating function in block 2 is selected, and the code is generated according to blocks 3 through 5.

The method of generating codes in accordance with the present invention is illustrated by Examples 1 through 3, which follow.

EXAMPLE 1

For block 1, select p=5, α=2 of GF(5), and β=3 of GF(5), verifying the primitivity of α and β.

For block 2, the following generating functions are defined:

$f^{(0)}(x)=\text{mod}_5(x^2+x)$ $f^{(1)}(x)=\text{mod}_5(x^2+x+1)$ $f^{(2)}(x)=\text{mod}_5(x^2+x+2)$ $f^{(3)}(x)=\text{mod}_5(x^2+x+3)$ $f^{(4)}(x)=\text{mod}_5(x^2+x+4)$ $f^{(5)}(x)=\text{mod}_5(x+1)$.

For block 3, a matrix $A^{(k)}$ is determined for each code k in the code family, where $0 \leq k \leq 5$. Each matrix $A^{(k)}$ is based on the corresponding generating function $f^{(k)}$. FIG. 12 illustrates the code matrix $A^{(k)}$ for each code k in the code family. The values in the row above each matrix $A^{(k)}$ are the values of powers of α modulo 5 (i.e., $\text{mod}_5(\alpha^j)$ for $0 \leq j \leq 3$), and the column of values to the left of each matrix $A^{(k)}$ are the values of powers of β modulo 5 (i.e., $\text{mod}_5(\beta^i)$ for $0 \leq i \leq 3$).

For block 4, a position array $P^{(k)}$ is determined for each code k in the code family. For example, for code 0 and code 1, the position arrays are:

$P^{(0)}$=[0, 0, 0, 3, 4, 0, 0, 0, 0, 0, 0, 0, 0, 0, 15]

$P^{(1)}$=[0, 1, 0, 0, 0, 0, 0, 7, 8, 0, 0, 0, 0, 13, 0, 0 ].

For block 5, an occupancy array $C^{(k)}$ is determined for each code k in the code family. The occupancy arrays for the 6 (=p+1) codes are as follows:

$C^{(0)}$=[3, 4, 15]

$C^{(1)}$=[1, 7, 8, 13]

$C^{(2)}$=[2, 5, 11, 14]

$C^{(3)}$=[6, 9]

$C^{(4)}$=[0, 10, 12]

$C^{(5)}$=[3, 5, 14].

EXAMPLE 2

In Example 2, a larger code cycle is generated than in Example 1. For block 1, the following are selected: p=29, which results in a Galois field GF(29) having 12 primitive elements; α=21 of GF(29); and β=27 of GF(29) are chosen and verified to be primitive.

As per block 2, 30 generating functions may be defined. However, since the generation of only two codes is desired, generating functions for code 17 and code 26, which were selected arbitrarily for this example to illustrate control over the number of codes generated, are defined as follows:

$f^{(17)}(x)=\text{mod}_{29}(x^2+x+17)$ $f^{(26)}(x)=\text{mod}_{29}(x^2+x+26)$.

After performing blocks 3 through 5, the occupancy arrays are generated for code 17 and code 26. The code cycle for each code has 28 (=p−1) components and 784 (=(p−1)$^2$=(28)$^2$) subcomponents, and each code has between 26 (=p−3) and 28 (=p−1) components containing signal portions within a subcomponent and between 0 and 2 components without a signal present. The occupancy arrays $C^{(17)}$ and $C^{(26)}$ for code 17 and code 26, respectively, are:

$C^{(17)}$=[23, 41, 56, 95, 125, 160, 184, 210, 239, 260, 297, 328, 353, 366, 399, 435, 473, 500, 504, 555, 574, 590, 640, 660, 753, 767]

$C^{(26)}$=[14, 36, 65, 108, 120, 159, 190, 213, 235, 254, 287, 327, 343, 382, 397, 431, 449, 513, 546, 577, 606, 666, 682, 710, 729, 780].

Figure 13:
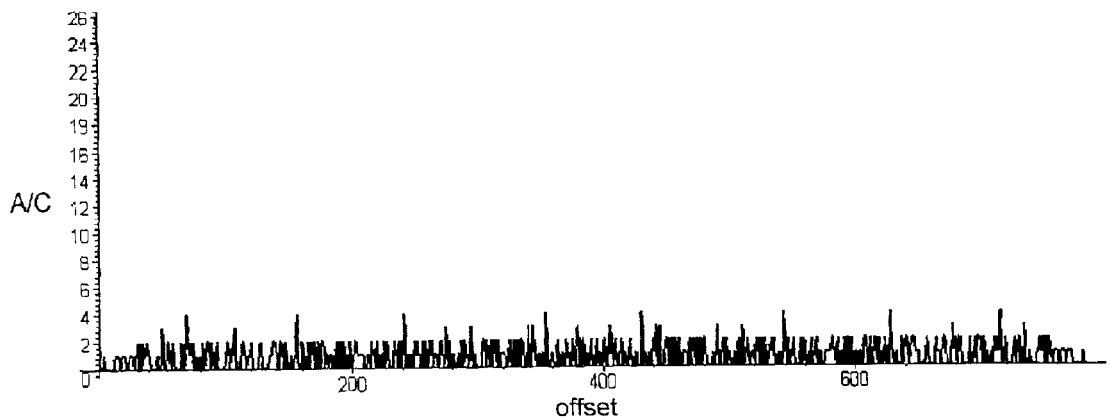
FIG. 13 illustrates autocorrelation values for Example 2.

FIG. 13 depicts the autocorrelation of code 17 for 784 subframe offsets across the code cycle. The autocorrelation has a maximum value of 4 disregarding the zero offset value of 26. One skilled in the art will recognize that the autocorrelation for the zero offset has a value of 26 because the code specifies that a signal portion is not present in two of the 28 components. Had the code specified that all 28 components have signal portions present, the correlation for the zero offset would have a value of 28. Similarly, had the code specified that one of the 28 components not have a signal portion present, the correlation for the zero offset would have a value of 27. Thus, unlike prior art codes, where the autocorrelation for the zero offset of a code specifying the signal portions within a value layout having n components is n, the autocorrelation for the zero offset of a code can be n, n−1, or n−2 depending on the number of components without a signal present, which can be zero, one, or two.

Figure 14:
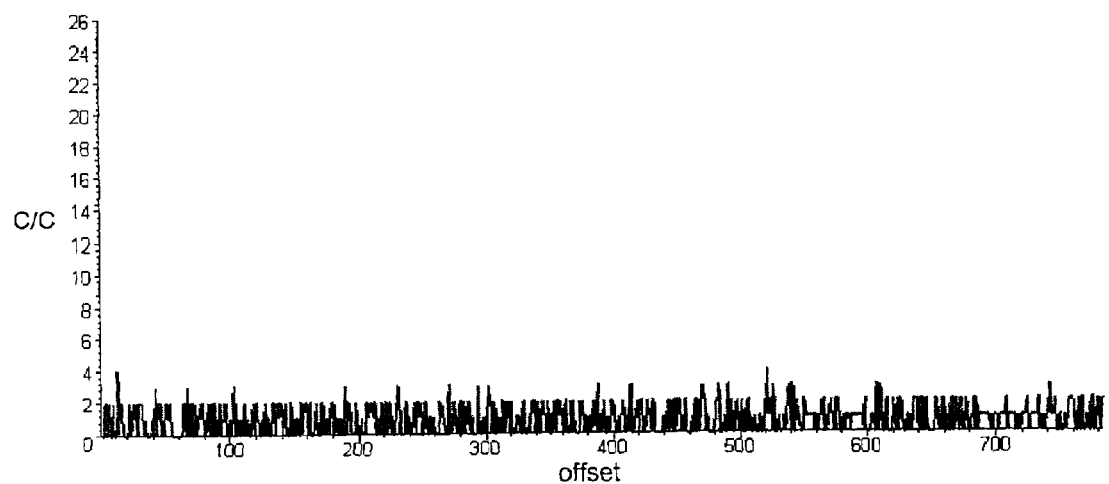
FIG. 14 illustrates cross-correlation values for Example 2.

FIG. 14 depicts the cross-correlation between code 17 and code 26 for 784 subframe offsets across the code cycle. The cross-correlation between codes 17 and 26 has a maximum value of 4.

EXAMPLE 3

In Example 3, a slightly smaller code cycle than that of Example 2 is generated. As per block 1, the following are selected: p=23; α=19 of GF(23) and β=11 of GF(23), and 19 and 11 are verified as primitive in GF(23). Applying blocks 2 through 5, occupancy arrays C are generated for the 24 codes of the code family as shown in FIG. 15. Each row in FIG. 15 corresponds to one of the codes. The code cycle for each code has 484 (=$(p-1)^2$=$(22)^2$) subcomponents, and each code has either 20, 21 or 22 (p−3, p−2, or p−1) components containing signals within a subcomponent. FIG. 15 also illustrates the code compression aspect of the current invention, where several of the 24 codes of the code family can be seen to be shorter than the others due to the occupancy array method of representing them.

Figure 16:
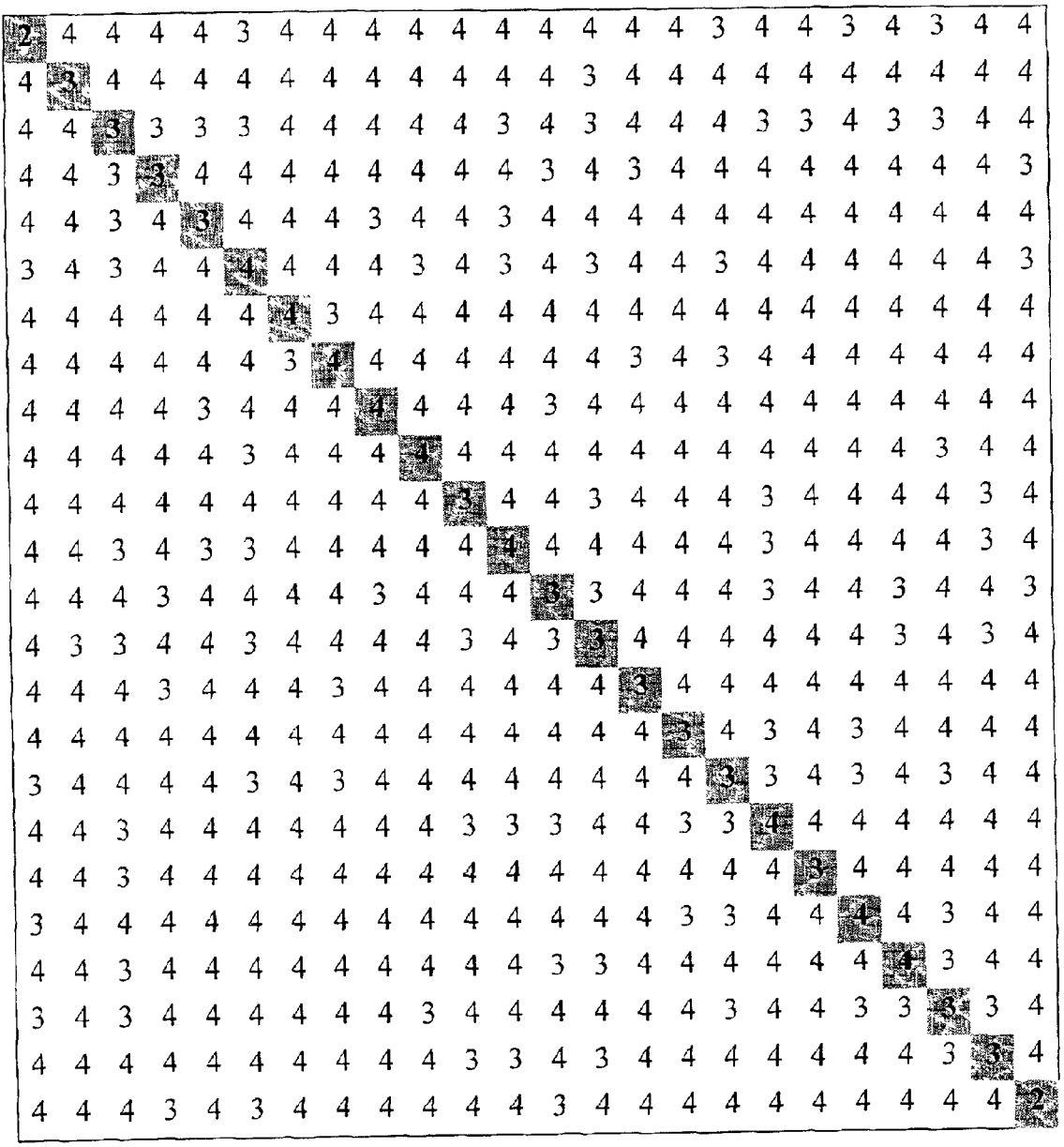
FIG. 16 illustrates maximum cross-correlation values for Example 3.

FIG. 16 illustrates the maximum correlation values between the 24 codes in the code family. The code values are illustrated in the form of a 24×24 matrix. The elements on the main diagonal of the matrix (shaded elements) are the maximum autocorrelation values for each of the 24 codes disregarding the zero offsets where autocorrelation values are 20, 21, and 22. The elements off the main diagonal of the matrix are the maximum cross-correlation values between the 24 codes of the code family. The matrix illustrates that the autocorrelation values for each of the 24 codes have a maximum value of 4 disregarding the zero offsets and that the cross-correlation values between the 24 codes have a maximum value of 4.

The invention has been described as a method for generating codes. These codes can be used, for example, to specify characteristics of pulses used in an impulse radio system. In addition, one or more of the inventive codes and/or the inventive method for generating one or more of the inventive codes can be stored in a computer readable-medium. A "computer-readable medium" refers to any storage device used for storing data accessible by a computer. These codes can have additional applications when used as part of a computer. A "computer" refers to any apparatus that is capable of accepting a structured input, processing the structured input according to prescribed rules, and producing results of the processing as output. Further, the codes of the invention can generally be considered numerical sequences for use with various systems to, for example, communicate and/or store information. In addition, the method of the invention for generating codes can generally be considered a method for generating numerical sequences for use with various systems to, for example, communicate and/or store information. Other systems for using the codes of the invention will become apparent to those of ordinary skill in the art.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention. In particular, those skilled in the art will recognize that various conventions such as the assignment of matrix columns to layout components and matrix rows to layout subcomponents, the order in which a matrix or an array is used, an enumeration scheme, etc. are not limiting of the invention and that an alternative convention can be employed and described equations and methods of the invention can be modified consistent with the alternative convention without departing from the invention.

What is claimed is:

1. A method of generating a family of number sequences, comprising the steps of:

specifying a prime number, p, having magnitude greater than 3 and an associated Galois field, GF(p);

selecting a first primitive element of GF(p), α, and a second primitive element of GF(p), β, wherein α=β or a α≠β;

defining a family of p+1 polynomials, wherein k is an integer and $0 \leq k \leq p$, wherein $f_k(x) = \mod_p(x^2+x+k)$ when k<p and $f_k(x) = \mod_p(x+1)$ when k=p;

defining a family of p+1 matrices, wherein each matrix, $A^{(k)}$, has dimension (p−1)×(p−1) and the element of row i in column j of matrix $A^{(k)}$, $A^{(k)}_{ij}$, is defined to have a first state when $f_k(\alpha^j) = \mod_p(\beta^i)$ and is otherwise defined to have a second state; and producing a family of p+1 number sequences, wherein the values of members of each number sequence, $S_k$, are determined in accordance with the elements of a corresponding matrix, $A^{(k)}$, of said family of p+1 matrices.

2. The method of claim 1, wherein producing a family of p+1 number sequences comprises the steps of:

enumerating the position of each element $A^{(k)}_{ij}$ within each matrix $A^{(k)}$, and producing a number sequence, $S_k$, in accordance with each matrix, $A^{(k)}$, wherein the values of the members of said number sequence are the position numbers of the elements in said matrix having said first state.

3. The method of claim 1, wherein producing a family of p+1 number sequences comprises the step of:

producing in accordance with each matrix, $A^{(k)}$, a number sequence, $S_k$, having members in accordance with each column j of said matrix, wherein the value of a member is either the row index, i, of the element $A^{(k)}_{ij}$ within said column j having said first state or null when all elements within said column j have said second state.

4. The method of claim 1, wherein a number sequence, $S_k$, of said family of p+1 number sequences is mapped to a value layout having (p−1) components each having (p−1) subcomponents, wherein said number sequence has a maximum autocorrelation value that is less than or equal to 4 for any nonzero offset and a maximum cross-correlation value that is less than or equal to 4 for any offset when correlated against a second number sequence of said family of p+1 number sequences.

5. The method of claim 4, wherein said value layout corresponds to layout for at least one characteristic of a non-impulse radio signal.

6. The method of claim 5, wherein said characteristic is one of:
   a frequency characteristic;
   a phase characteristic;
   a phase difference characteristic;
   a time characteristic;
   a spreading code characteristic; and
   an amplitude characteristic.

7. The method of claim 5, wherein said non-impulse radio signal is one of:
   a CDMA signal;
   a TD-CDMA signal;
   a TDMA signal;
   a FDMA signal;
   an OFDM signal;
   a frequency-hopping system signal; and
   a direct sequence system signal.

8. The method of claim 4, wherein said value layout corresponds to a layout for at least one characteristic of an impulse radio signal.

9. The method of claim 8, wherein said characteristic is one of:
   a temporal pulse characteristic; and
   a non-temporal pulse characteristic.

10. The method of claim 9, wherein said temporal pulse characteristic is a position in time.

11. The method of claim 9, wherein said non-temporal pulse characteristic is one of:
    a pulse amplitude;
    a pulse width;
    a pulse polarity; and
    a pulse type.

12. The method according to claim 11, wherein said pulse polarity indicates whether said pulse is inverted.

13. A method of generating a family of codes that satisfy defined correlation properties, comprising the steps of:
    defining a signal characteristic value layout having n components;
    subdividing each of said n components into m subcomponents;
    generating said family of codes, wherein at least one code of said family of codes specifies that a signal is not present in at least one of said components but no more than two of said components when mapped to said signal characteristic value layout.

14. The method of claim 13, wherein m=n.

15. The method of claim 13, wherein the maximum cross-correlation of any two codes of said family of codes is less than or equal to 4 and the maximum autocorrelation of any code in said family of codes is less than or equal to 4 for any nonzero offset.

16. The method of claim 13, wherein said signal characteristic is one of:
    a frequency characteristic;
    a phase characteristic;
    a phase difference characteristic;
    a time characteristic;
    a spreading code characteristic; and
    an amplitude characteristic.

17. A method of code compression, comprising the steps of:
    enumerating the position of each element of a matrix corresponding to a code having defined correlation properties, wherein said code specifies a signal is not present in one or more components of a signal characteristic value layout; and
    storing in an array the assigned position number of each said element having a value that corresponds to a subcomponent within a component of said signal characteristic value layout.

18. The method of claim 17, wherein said matrix has n rows and m columns.

19. The method of claim 18, wherein the position number of each element, $n_{ij}=j \times n+i$, wherein $0 \leq i \leq (n-1)$ and $0 \leq j \leq (m-1)$.

20. The method of claim 17, wherein said signal characteristic is one of:
    a frequency characteristic;
    a phase characteristic;
    a phase difference characteristic;
    a time characteristic;
    a spreading code characteristic; and
    an amplitude characteristic.

* * * * *